United States Patent
Nakagawara et al.

(10) Patent No.: US 8,162,113 B2
(45) Date of Patent: Apr. 24, 2012

(54) CLUTCH CONTROL SYSTEM FOR VEHICLE

(75) Inventors: Masaki Nakagawara, Wako (JP); Hiroyuki Kojima, Wako (JP); Kazuyuki Fukaya, Wako (JP); Takashi Ozeki, Wako (JP); Taito Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 615 days.

(21) Appl. No.: 12/393,005

(22) Filed: Feb. 25, 2009

(65) Prior Publication Data
US 2009/0242345 A1 Oct. 1, 2009

(30) Foreign Application Priority Data

Mar. 28, 2008 (JP) ................................. 2008-086949

(51) Int. Cl.
*F16D 48/06* (2006.01)

(52) U.S. Cl. ................ 192/3.58; 192/48.601; 192/82 T; 192/85.63; 477/76; 477/174; 701/68

(58) Field of Classification Search ..................... 477/76
See application file for complete search history.

(56) References Cited

U.S. PATENT DOCUMENTS

| 4,678,069 A * | 7/1987 | Yoshimura et al. ............. 477/76 |
| 5,023,789 A * | 6/1991 | Lampe et al. ................... 701/68 |
| 7,291,091 B2 * | 11/2007 | Stengel ......................... 477/174 |

FOREIGN PATENT DOCUMENTS

JP 61-027340 A 2/1986

* cited by examiner

*Primary Examiner* — Richard M. Lorence
(74) *Attorney, Agent, or Firm* — Ditthavong Mori & Steiner, P.C.

(57) ABSTRACT

A clutch control system for a vehicle includes an actuator which is configured to control a hydraulic pressure. A timer is configured to measure a time period from a timing at which a hydraulic pressure supply source starts supplying hydraulic oil to a hydraulic clutch to a timing at which the hydraulic pressure reaches a predetermined value. A clutch control compensator is configured to calculate a control compensation value of an amount of operation of the actuator based on the time period measured by the timer. A clutch controller is configured to control the actuator based on the control compensation value and the amount of operation of the actuator using a deviation between the hydraulic pressure detected by the hydraulic pressure detector and a target hydraulic pressure set according to a condition of the vehicle.

20 Claims, 13 Drawing Sheets

< RESPONSE TIME-COMPENSATION GAIN TABLE >

< NO GAIN COMPENSATION AT HIGH VISCOSITY >

< GAIN COMPENSATED AT HIGH VISCOSITY >

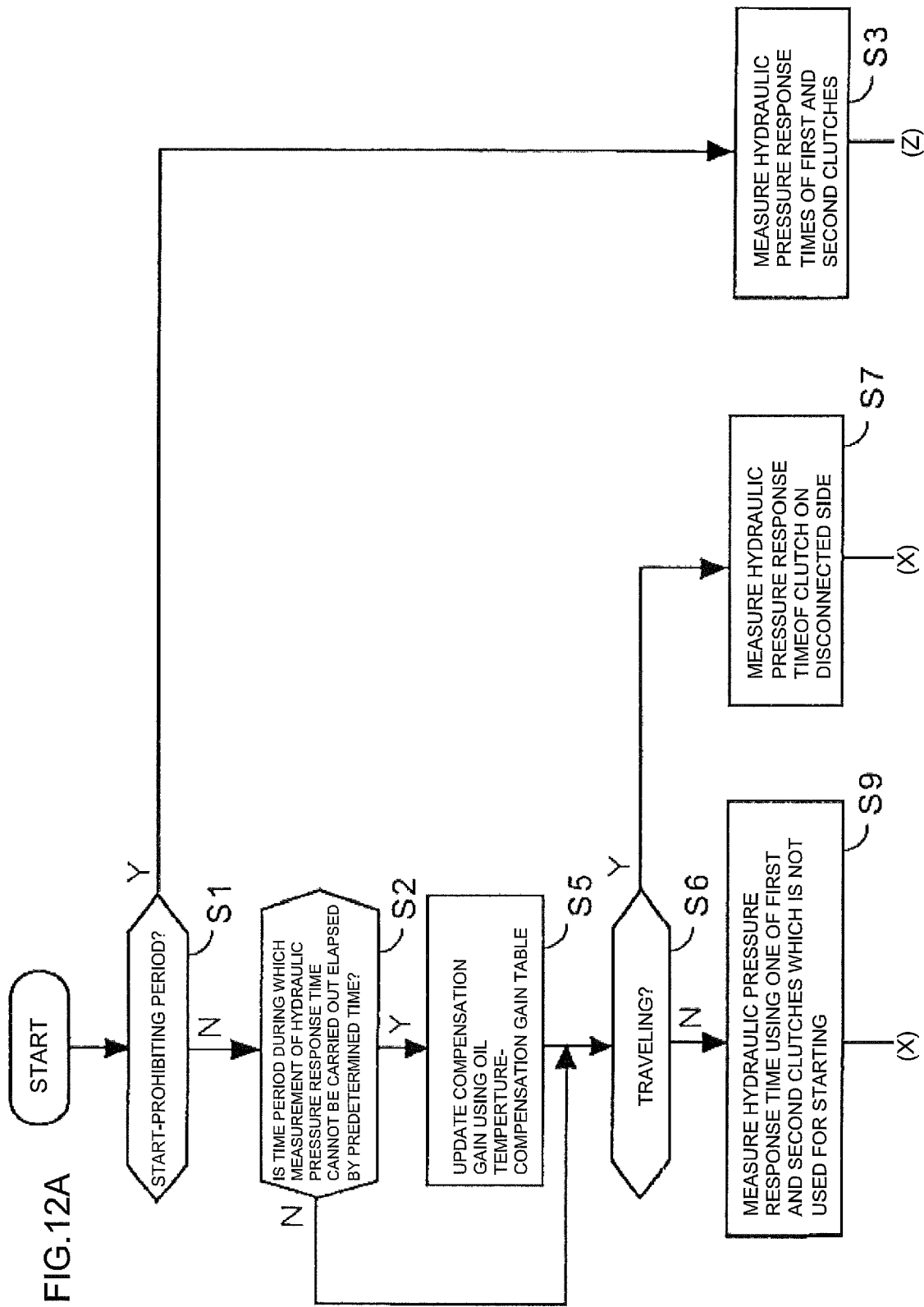

CLUTCH CONTROL SYSTEM FOR VEHICLE

CROSS-REFERENCE TO RELATED APPLICATIONS

The present application claims priority under 35 U.S.C. §119 to Japanese Patent Application No. 2008-086949, filed Mar. 28, 2008. The contents of this application are incorporated herein by reference in their entirely.

BACKGROUND OF THE INVENTION

1. Field of the Invention

The present invention relates to a clutch control system.

2. Discussion of the Background

In the related art, in a transmission device which electrically controls a hydraulic clutch which connects and disconnects a rotary drive force of a power source with respect to a transmission, a configuration in which an actuator including an electromagnetic valve and the like is provided between a hydraulic pressure supply source including a hydraulic pressure pump and a clutch, and the flow rate of hydraulic oil is controlled by the actuator so that the hydraulic pressure exerted on the clutch is controlled is known. In such the transmission device, when the viscosity of the hydraulic oil is changed, the timing of connection of the clutch is fluctuated even when the same drive command is issued to the actuator, so that the feeling of travel might vary.

JP-A-61-27340 discloses a configuration in which the relation between the temperature and the viscosity of the hydraulic oil is stored in a memory in advance, the change of viscosity of the hydraulic oil is estimated from the oil temperature sensed by an oil temperature sensor, and the clutch is feedback-controlled on the basis of the estimated value.

However, with the technology described in Patent Document 1, the relation between the temperature and the viscosity of the hydraulic oil which is used here is a predetermined unique relation, and hence when the relation between the oil temperature and the viscosity is changed due to deterioration or replacement of the hydraulic oil, the control compensation value might be deviated.

SUMMARY OF THE INVENTION

According to one aspect of the present invention, a clutch control system for a vehicle includes an actuator, a hydraulic pressure detector, a timer, a clutch control compensator, and a clutch controller. The actuator is provided between a hydraulic pressure supply source and a hydraulic clutch and configured to control a hydraulic pressure of hydraulic oil supplied by the hydraulic pressure supply source to the hydraulic clutch. The hydraulic clutch is configured to connect and disconnect a drive wheel and a power source of the vehicle. The hydraulic pressure detector is configured to detect the hydraulic pressure. The timer is configured to measure a time period from a timing at which the hydraulic pressure supply source starts supplying hydraulic oil to the hydraulic clutch to a timing at which the hydraulic pressure detected by the hydraulic pressure detector reaches a predetermined value. The clutch control compensator is configured to calculate a control compensation value of an amount of operation of the actuator based on the time period measured by the timer. The clutch controller is configured to control the actuator based on the control compensation value and the amount of operation of the actuator using a deviation between the hydraulic pressure detected by the hydraulic pressure detector and a target hydraulic pressure set according to a condition of the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

FIGS. 12A and 12B are flowcharts showing the flow of the clutch control according to the embodiment.

DESCRIPTION OF THE EMBODIMENT

Figure 1:
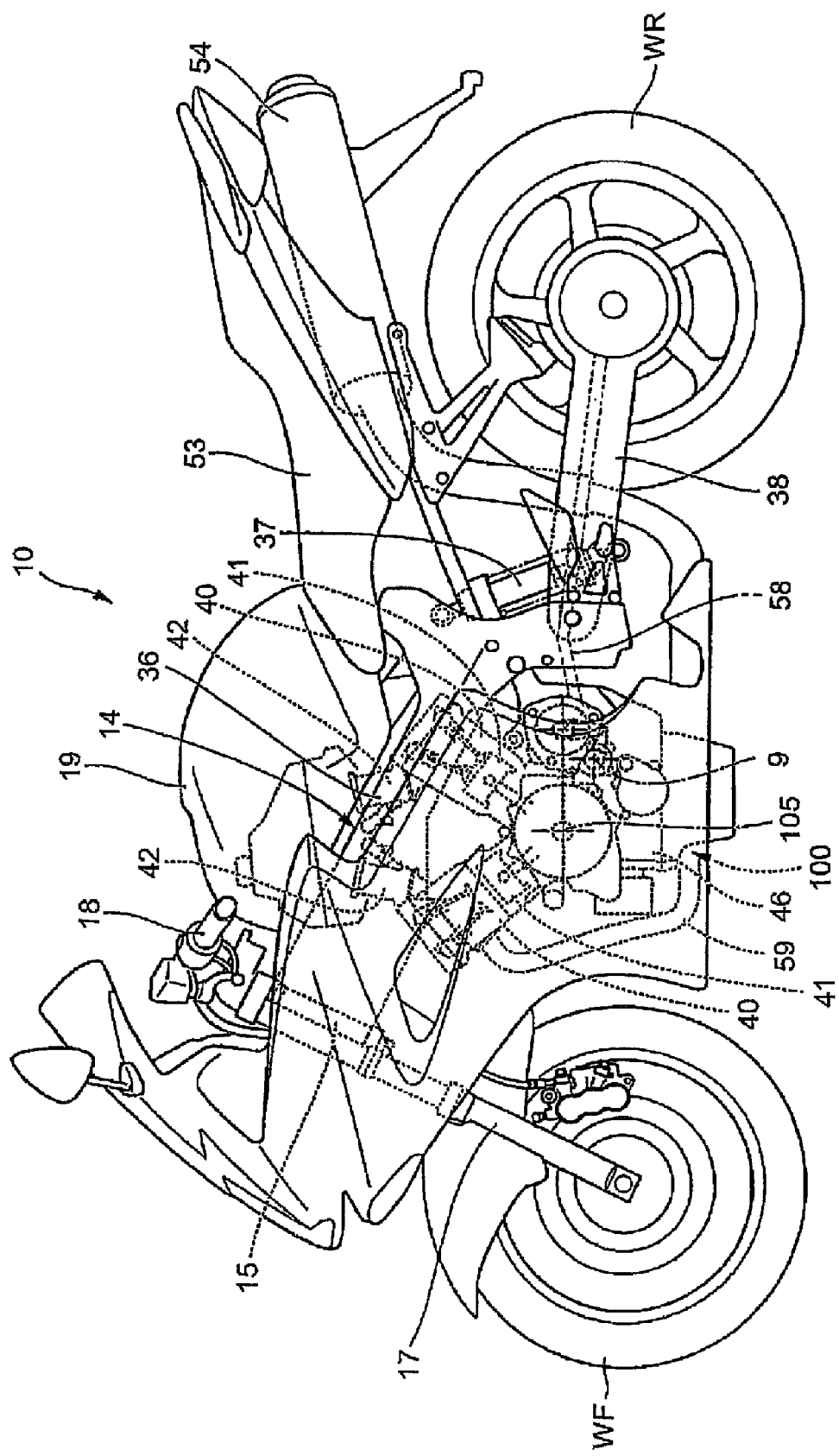
FIG. 1 is a side view of a motorcycle to which a clutch control system according to one embodiment of the invention is applied.

Embodiments will now be described with reference to the accompanying drawings, wherein like reference numerals designate corresponding or identical elements throughout the various drawings.

Figure 2:
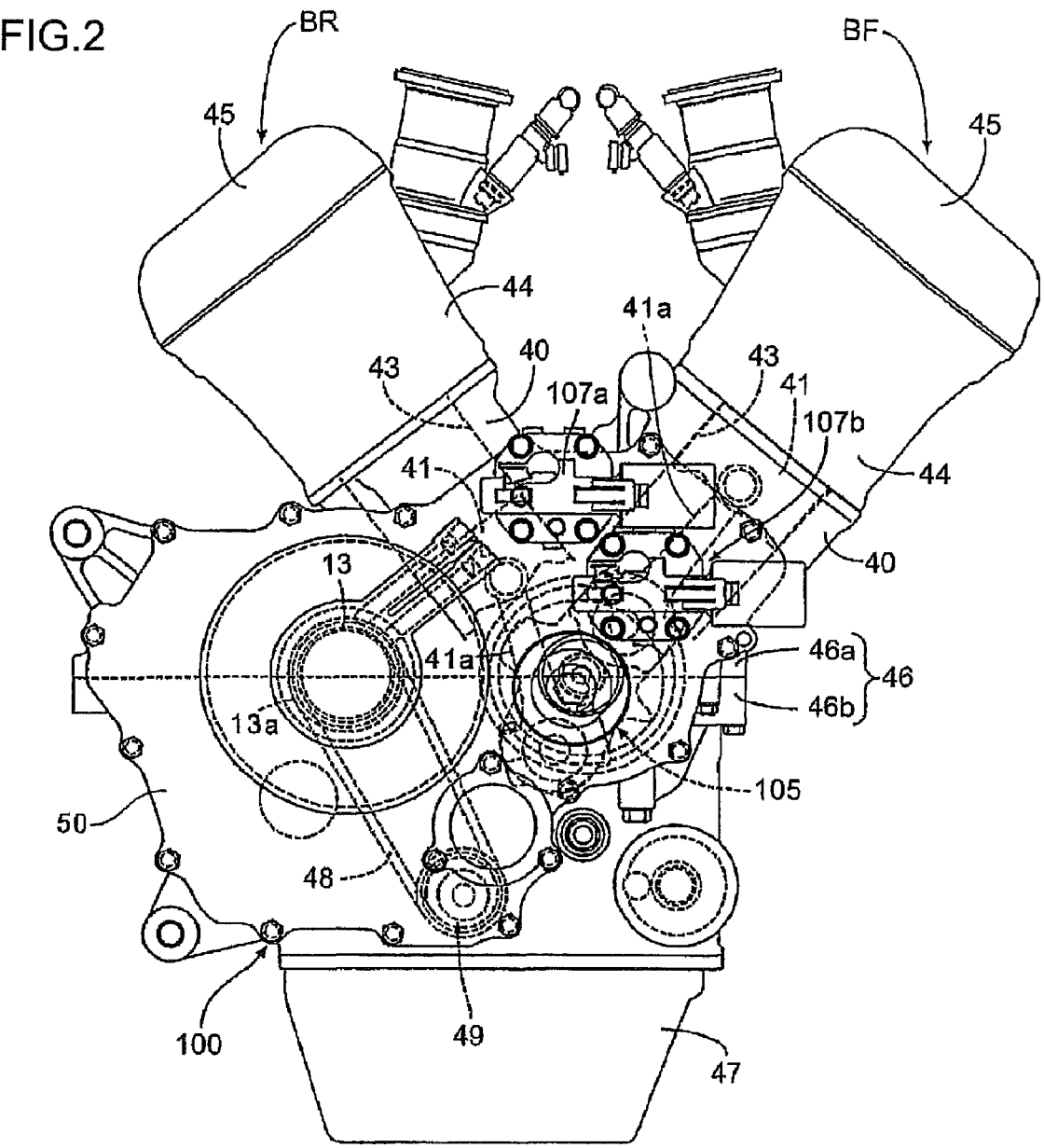
FIG. 2 is a left side view of an engine as a power source of the motorcycle.

Hereinafter, a preferred embodiment of the present invention is explained in detail in conjunction with drawings. FIG. 1 is a side view of a motorcycle 10 to which a clutch control system according to one embodiment of the invention is applied. FIG. 2 is a left side view of an engine 100 as a power source of the motorcycle 10. A vehicle body frame 14 of the motorcycle 10 includes a pair of left and right main pipes 36, and a head pipe 15 is provided on the front side of the main pipes 36 with respect to the vehicle body. A pair of left and right front forks 17 for rotatably supporting a front wheel WF and supporting a steering handle 18 is rotatably supported by the head pipe 15.

The engine 100 suspended below the main pipes 36 is a V-four engine having cylinders arranged on the front and back at a predetermined angle. Pistons 41 and valve mechanisms which make sliding movement in the cylinder blocks 40 have the same configuration in the four cylinders. A crankcase 46 accommodates crankshafts 105 which rotatably support connecting rods 41a for supporting the pistons 41, a main shaft 13 and a countershaft having a plurality of gear pairs which constitute a transmission mounted thereon.

Air funnels 42 for introducing new air passed through an air cleaner box disposed below a fuel tank 19 into air-intake ports of the respective cylinders are provided between the front and rear cylinder blocks. The respective air funnels 42 each include a fuel injection valve attached thereto. A muffler 54 for discharging combustion gas introduced toward the rear of the vehicle body by an exhaust pipe 59 connected to an exhaust port of the cylinder blocks 40 is provided below a sitting seat 53.

A swing arm 38 being suspended by a shock unit 37 for rotatably supporting a rear wheel WR is swingably supported on the lower rear portion of the main pipe. A drive shaft 58 for transmitting a rotary drive force of the engine outputted from a countershaft 9 to the rear wheel WR as the drive wheel is disposed in the interior of the swing arm 38.

Referring now to FIG. 2, a front bank BF and a rear bank BR which constitute the engine 100 each include a cylinder head 44 attached on the upper side of cylinder blocks 40 for storing a valve mechanism and a head cover 45 for covering the upper end of the cylinder head 44. The pistons 41 make a sliding movement in the inner peripheral portions of cylinders 43 formed in the cylinder blocks 40. The crankcase 46 includes an upper case half 46a integrally molded with the cylinder blocks 40 and a lower case half 46b to which an oil pan 47 is attached. A water pump 49 for pumping coolant of the engine 100 is driven to rotate by an endless chain 48 wound around a sprocket 13a formed on the main shaft 13. A clutch cover 50 is attached to a side surface of the crankcase 46 on the right side in the vehicle width direction.

The engine 100 according to the embodiment includes a hydraulic clutch for connecting and disconnecting the rotary drive force between the engine 100 and the transmission of a twin-clutch system including a first clutch and a second clutch, and is adapted to control the hydraulic pressure to be supplied to the twin clutch by an actuator. The left side of the engine 100 is provided with a first valve 107a and a second valve 107b mounted thereon as actuators for controlling the both clutches. The configuration of the transmission applied with the twin-clutch will be described later.

Figure 3:
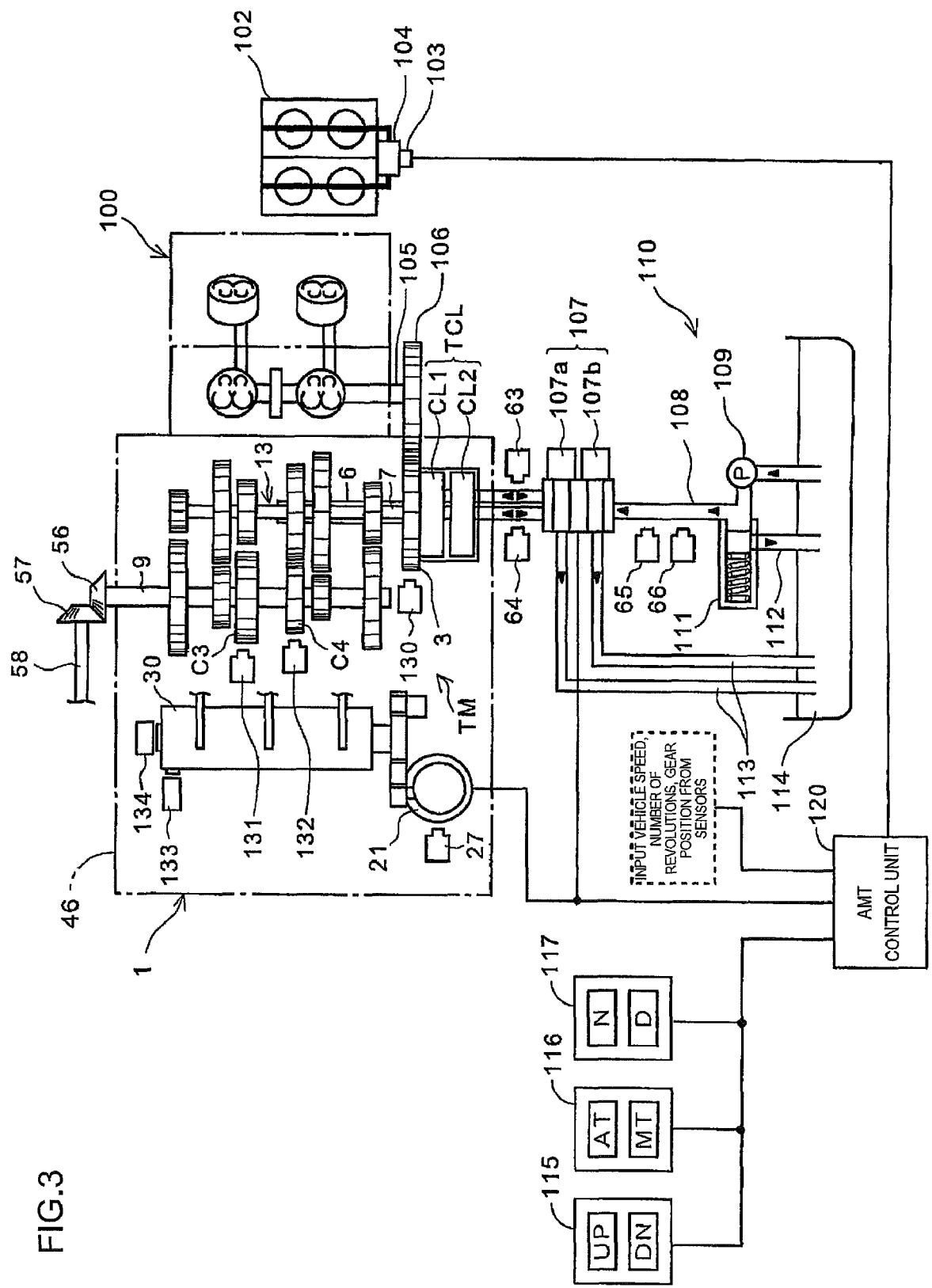
FIG. 3 is a system configuration view showing an AMT and the peripherals.

FIG. 3 is a system configuration drawing of an automatic manual transmission (hereinafter, referred to as AMT) 1 as an automatic transmission and peripheral devices thereof. The AMT 1 is configured as a twin-clutch transmission device which connects and disconnects the rotary drive force of the engine by the two clutches disposed on the main shaft. The AMT 1 stored in the crankcase 46 is controlled to drive by a clutch hydraulic power unit 110 and an AMT control unit 120. The AMT control unit 120 includes a clutch controller for controlling to drive a valve 107. The engine 100 has a throttle body 102 of a throttle-by-wire system and the throttle body 102 includes a motor 104 for opening and closing a throttle.

The AMT 1 includes a transmission TM having six gears for advancement, a twin clutch TCL having a first clutch CL1 and a second clutch CL2, a shift drum 30, and a shift control motor 21 for rotating the shift drum 30. A number of gears constituting the transmission TM are connected or loosely fitted to the main shaft 13 and the countershaft 9, respectively. The main shaft 13 includes an inner main shaft 7 and an outer main shaft 6. The inner main shaft 7 is connected to the first clutch CL1, and the outer main shaft 6 is connected to the second clutch CL2. The main shaft 13 and the countershaft 9 each includes a transmission gears which are able to be displaced in the axial direction of the main shaft 13 and the countershaft 9, and end portions of shift forks 71, 72, 81, and 82 (see FIG. 5) are engaged with a plurality of guide grooves formed on the transmission gears and the shift drum 30.

A primary drive gear 106 is connected to an output shaft of the engine 100, that is, the crankshaft 105, and the primary drive gear 106 engages a primary driven gear 3. The primary driven gear 3 is connected to the inner main shaft 7 via the first clutch CL1, and is connected to the outer main shaft 6 via the second clutch CL2. The AMT 1 includes an inner spindle revolution counting (revolving speed) sensor 131 and an outer spindle revolution counting (revolving speed) sensor 132 for sensing the revolving speeds of the inner main shaft 7 and the outer main shaft 6 respectively by measuring the revolving speed of the predetermined transmission gear on the countershaft 9.

The inner spindle revolution counting sensor 131 engages the transmission gear attached to the inner main shaft 7 so as not to be rotatable and senses the revolving speed of a transmission gear C3 on the driven side attached to the countershaft 9 so as to be rotatable but not sliding. The outer spindle revolution counting sensor 132 engages the transmission gear which is attached to the outer main shaft 6 so as not to be rotatable and is configured to sense the revolving speed of a transmission gear C4 on the driven side attached to the countershaft 9 so as to be rotatable but not sliding. Detailed description of a gear train disposed on the respective shafts will be described later.

A bevel gear 56 is connected to an end of the countershaft 9, and the bevel gear 56 engages a bevel gear 57 connected to the drive shaft 58, so that the rotary drive force of the countershaft 9 is transmitted to the rear wheel WR. The AMT 1 includes therein an engine revolution counting sensor 130 arranged so as to oppose the periphery of the primary driven gear 3, a gear position sensor 134 for sensing the gear shift position of the transmission TM on the basis of the rotational position of the shift drum 30, a shifter sensor 27 for sensing the rotational position of a shifter being driven by the shift control motor 21, and a neutral switch 133 for sensing that the shift drum 30 is at the neutral position. The throttle body 102 is provided with a throttle opening sensor 103 for detecting the throttle opening.

The clutch hydraulic power unit 110 according to the embodiment has a configuration to serve both as lubricant of the engine 100 and the hydraulic oil for driving the twin clutch. The clutch hydraulic power unit 110 includes an oil tank 114 and a conduit 108 for delivering oil (hydraulic oil) in the oil tank 114 to the first clutch CL1 and the second clutch CL2. The conduit 108 includes a hydraulic pressure pump 109 as a hydraulic pressure supply source and a valve (electromagnetic control valve) 107 as an actuator arranged thereon, and a return line 112 connected to the conduit 108 includes a regulator 111 provided thereon for maintaining the hydraulic pressure to be supplied to the valve 107 at a constant value. The valve 107 includes the first valve 107a and the second valve 107b which are able to apply an hydraulic pressure independently to the first clutch CL1 and the second clutch CL2, and each include a return line 113 of the oil.

The conduit which connects the first valve 107a and the first clutch CL1 is provided with a first hydraulic pressure sensor 63 for measuring the hydraulic pressure exerted on the conduit, that is, the hydraulic pressure exerted on the first clutch CL1. In the same manner, the conduit which connects the second valve 107b and the second clutch CL2 is provided with a second hydraulic pressure sensor 64 for measuring the hydraulic pressure exerted on the second clutch CL2. The conduit 108 which connects the hydraulic pressure pump 109 and the valve 107 is provided with a main hydraulic pressure sensor 65 and an oil temperature sensor 66 as an oil temperature sensing means.

A mode switch 116 for switching the mode between an automatic transmission (AT) mode and a manual transmission (MT) mode, a shift select switch 115 for issuing a transmission command such as a shift-up (UP) or a shift-down (DN) command, and a neutral select switch 117 for switching the shift position between a neutral (N) and a drive (D) are connected to the AMT control unit 120. The AMT control unit 120 includes a central processing unit (CPU), and is able to control the valve 107 and the shift control motor 21 according to output signals from the above-described sensors or switches and switch the gear shift position of the AMT 1 automatically or semi-automatically.

The AMT control unit 120 switches the gear shift position automatically according to data such as the vehicle speed, the number of engine revolution, and the throttle opening when the AT mode is selected, and switches the transmission TM between the shift-up and shift-down in association with the operation of the shift select switch 115 when the MT mode is selected. Even when the MT mode is selected, an auxiliary automatic transmission control for preventing excessive rotations or stalling of the engine can be carried out.

In the clutch hydraulic power unit 110, a hydraulic pressure is applied to the valve 107 by the hydraulic pressure pump 109, and the hydraulic pressure is controlled by the regulator 111 so as not to exceed an upper limit. When the valve 107 is opened by an instruction from the AMT control unit 120, a hydraulic pressure is applied to the first clutch CL1 or the second clutch CL2, and the primary driven gear 3 is connected to the inner main shaft 7 or the outer main shaft 6 via the first clutch CL1 or the second clutch CL2. When the valve 107 is closed and application of the hydraulic pressure is stopped, the first clutch CL1 and the second clutch CL2 are urged by a return spring (not shown) integrated therein in the direction to disconnect the inner main shaft 7 and the outer main shaft 6.

The valve 107 which drives the both clutches by opening and closing the conduits which connect the conduit 108 and the both clutches is adapted to be able to change the time period from when the conduit is shifted from the fully closed state to the fully opened state arbitrarily by adjusting the drive signals by the AMT control unit 120.

The shift control motor 21 rotates the shift drum 30 according to the instruction from the AMT control unit 120. When the shift drum 30 rotates, shift forks are displaced axially of the shift drum 30 according to the shape of the guide groove formed on the periphery of the shift drum 30. Accordingly, the engagement of the countershaft 9 and the gears on the main shaft 13 is changed to switch the transmission to a state of being capable of shifting up or shifting down.

In the AMT 1 according to the embodiment, the inner main shaft 7 to be connected to the first clutch CL1 is adapted to support odd-numbered gear speeds (1, 3, $5^{th}$ gears), and the outer main shaft 6 to be connected to the second clutch CL2 is adapted to support even-numbered gear speeds (2, 4, $6^{th}$ gears). Therefore, for example, while the vehicle is traveling at the odd-numbered gear speed, the supply of the hydraulic pressure to the first clutch CL1 is continued, so that the connected state is maintained. When the shift change is carried out, the operation of transmission can be completed only by switching the connected state of the both clutches by changing the engagement of the gears by the rotation of the shift drum 30 in advance.

Figure 4:
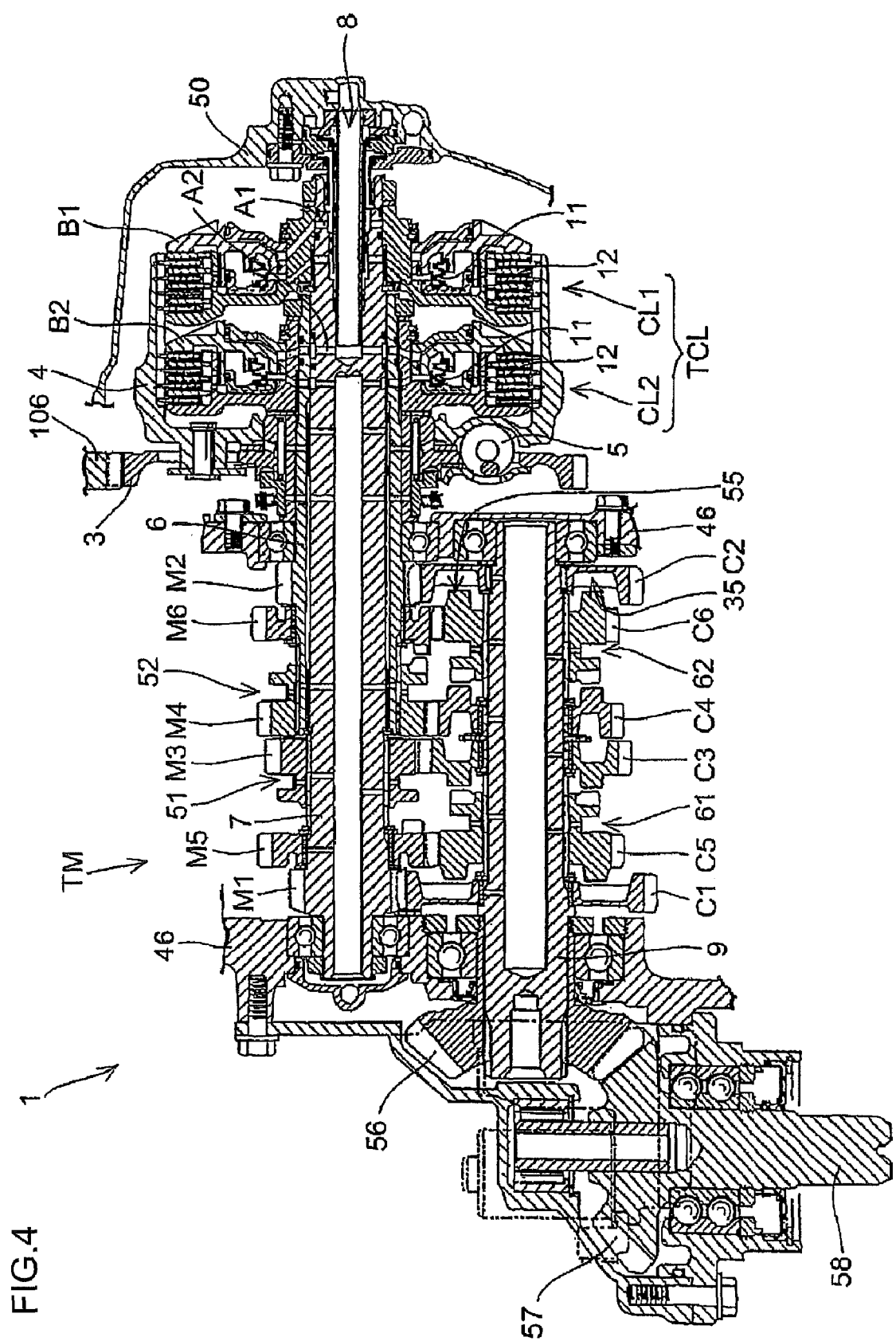
FIG. 4 is an enlarged cross-sectional view of a transmission.

FIG. 4 is an enlarged cross-sectional view of the transmission TM. The same reference numerals designate the same or equivalent components. A rotary drive force transmitted from the crankshafts 105 to the primary driven gear 3 having a shock-absorbing mechanism 5 via the primary drive gear 106 of the engine 100 is outputted from the twin clutch TCL via the outer main shaft 6, the inner main shaft 7 rotatably supported by the outer main shaft 6, and six gear pairs provided between the main shaft (outer main shaft 6 and inner main shaft 7) 13 and the countershaft 9 to the countershaft 9 having the bevel gear 56 attached thereto. The rotary drive force transmitted to the bevel gear 56 is bent in the direction of rotation toward the rear of the vehicle body by being engaged with the bevel gear 57, and is transmitted to the drive shaft 58.

The transmission TM has a six transmission gear pairs between the main shaft and the counter shaft, and is able to select the gear pair to be used for outputting the rotary drive force by the combination of the position of slidable gears attached to the respective shafts so as to be capable of sliding in the axial direction and the connected or disconnected state of the first clutch CL1 and the second clutch CL2. The twin clutch TCL is disposed in the interior of a clutch case 4 which rotates integrally with the primary driven gear 3. The first clutch CL1 is attached to the inner main shaft 7 so as not to be able to rotate, while the second clutch CL2 is attached to the outer main shaft 6 so as not to be able to rotate. A clutch panel 12 including four drive friction discs supported by the clutch case 4 so as not to be rotatable and four driven friction discs supported by both clutches so as not to be rotatable is disposed between the clutch case 4 and the both clutches.

The first clutch CL1 and the second clutch CL2 are configured to be switched to a connected state by a frictional force exerted on the clutch panel 12 when the hydraulic pressure from the hydraulic pressure pump 109 (see FIG. 3) is supplied. A distributor 8 which forms two hydraulic pressure channels of a double tube shape in the interior of the inner main shaft 7 is embedded in the wall surface of the clutch cover 50 attached to the crankcase 46. Then, when the hydraulic pressure is supplied to the distributor 8 by the first valve 107a and the hydraulic pressure is supplied to an oil channel A1 formed in the inner main shaft 7, a piston B1 slides leftward in the drawing against the resilient force of a resilient member 11 such as a spring, and the first clutch CL1 is switched to the connected state. In contrast, when the hydraulic pressure is supplied to an oil channel A2, a piston B2 slides leftward in the drawing and the second clutch CL2 is switched to the connected state. The pistons B1 and B2 of the both clutches CL1 and CL2 are adapted to return to the initial position by the resilient force of the resilient member 11 when the application of the hydraulic pressure is stopped.

With the configuration as described above, the rotary drive force of the primary driven gear 3 simply rotates the clutch case 4 unless otherwise the hydraulic pressure is supplied to the first clutch CL1 or the second clutch CL2 and when the hydraulic pressure is supplied, however, drives the outer main shaft 6 or the inner main shaft 7 to rotate integrally with the clutch case 4. At this time, a semi-clutch state is also achieved by adjusting the supplied hydraulic pressure.

The inner main shaft 7 connected to the first clutch CL1 supports drive gears M1, M3, and M5 of the odd-numbered gear speeds (1, 3, and $5^{th}$ gears). The first gear speed drive gear M1 is formed integrally with the inner main shaft 7. The third gear speed drive gear M3 is attached so as to be slidable in the axial direction but not to be rotatable in the circumferential direction by spline engagement, and the fifth gear speed drive gear M5 is attached so as not to be slidable in the axial direction but to be rotatable in the circumferential direction.

In contrast, the outer main shaft 6 connected to the second clutch CL2 supports the drive gears M2, M4, and M6 of the even-numbered gear speeds (1, 3, and $5^{th}$ speeds). The second gear speed drive gear M2 is formed integrally with the outer main shaft 6. The fourth gear speed drive gear M4 is attached so as to be slidable in the axial direction but not to be rotatable in the circumferential direction by the spline engagement, and the sixth gear speed drive gear M6 is attached so as not to be slidable in the axial direction but to be rotatable in the circumferential direction.

The countershaft 9 supports driven gears C1 to C6 which are engaged with the drive gears M1 to M6. The driven gears C1 to C4 of 1 to $4^{th}$ speeds are attached so as not to be slidable in the axial direction but to be rotatable in the circumferential direction, and the driven gears C5 and C6 of the 5 and $6^{th}$ speeds are attached so as to be slidable in the axial direction but not to be rotatable in the circumferential direction.

The drive gears M3 and M4 and the driven gears C5 and C6, from among the above-described gear train, that is, the "slidable gears" which are slidable in the axial direction is configured so as to be slid in association with the operation of the shift forks, described later, and the respective slidable gears are formed with engaging grooves 51, 52, 61 and 62 with which claws of the shift forks engage. As described above, the inner spindle revolution counting sensor 131 (see FIG. 3) senses the revolving speed of the third gear speed driven gear C3, and the outer spindle revolution counting sensor 132 senses the revolving speed of the fourth gear speed driven gear C4.

The transmission gears other than the above-described slidable gears (drive gears M1, M2, M5, and M6 and the driven gears C1 to C4), that is, "unslidable gears" which are not slidable in the axial direction are adapted to connect and disconnect the rotary drive force with respect to the adjacent slidable gear. With the configuration as described above, the twin clutch transmission apparatus 1 in the embodiment is able to select one gear pair which transmits the rotary drive force arbitrarily by the combination of the position of the slidable gear and the connecting or disconnecting state of the both clutches CL1 and CL2.

In the embodiment, a dog clutch mechanism for transmitting the rotary drive force between the slidable gear and the unslidable gear is adopted. The dog clutch mechanism enables transmission of the rotary drive force without much loss by the engagement of projections and depressions composed of dog teeth and dog holes. In the embodiment, for example, four dog teeth 55 formed on the sixth gear speed driven gear C6 engage four dog holes 35 formed on the second gear speed driven gear C2.

Figure 5:
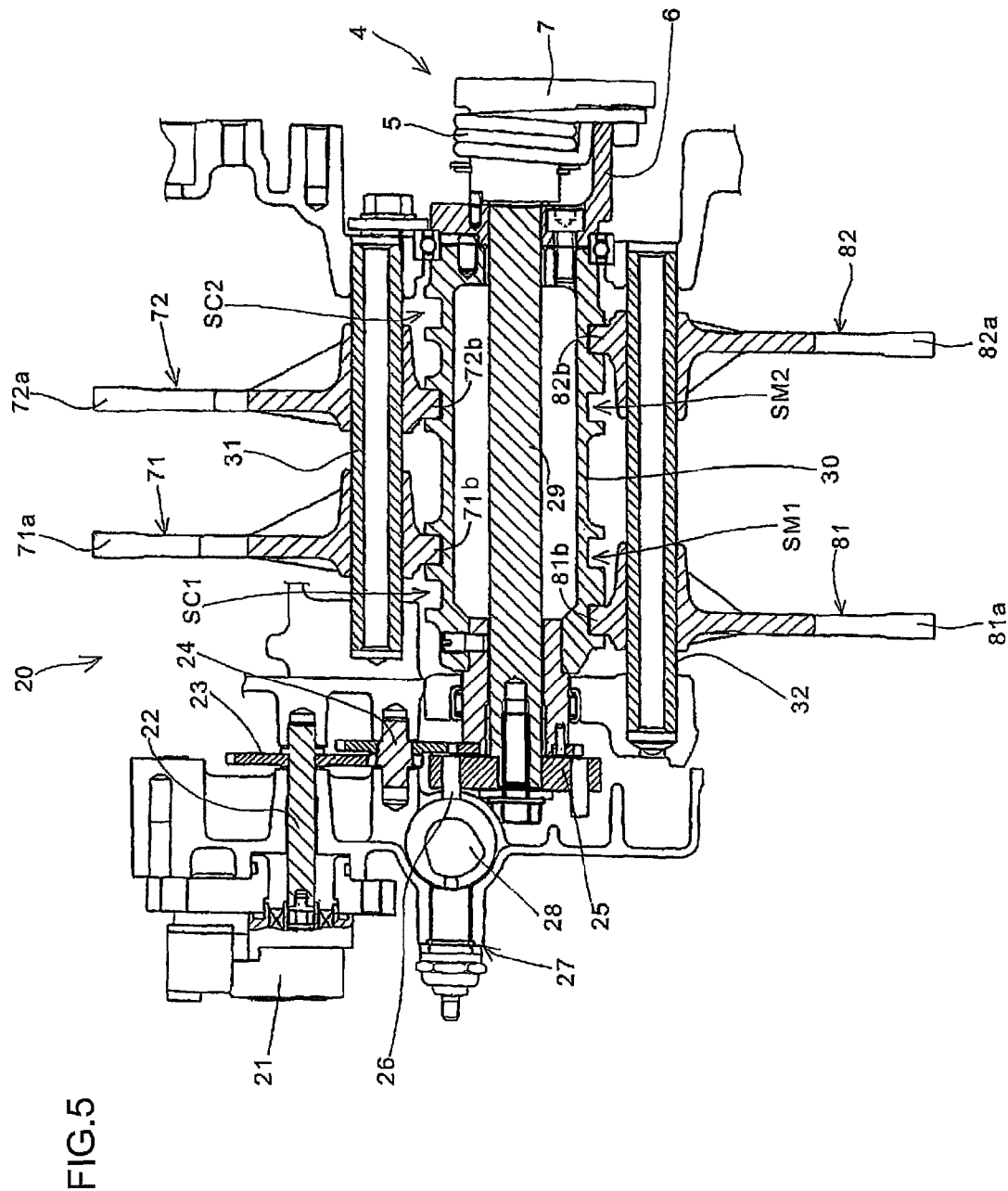
FIG. 5 is an enlarged cross-sectional view of a transmission mechanism.
Figure 6:
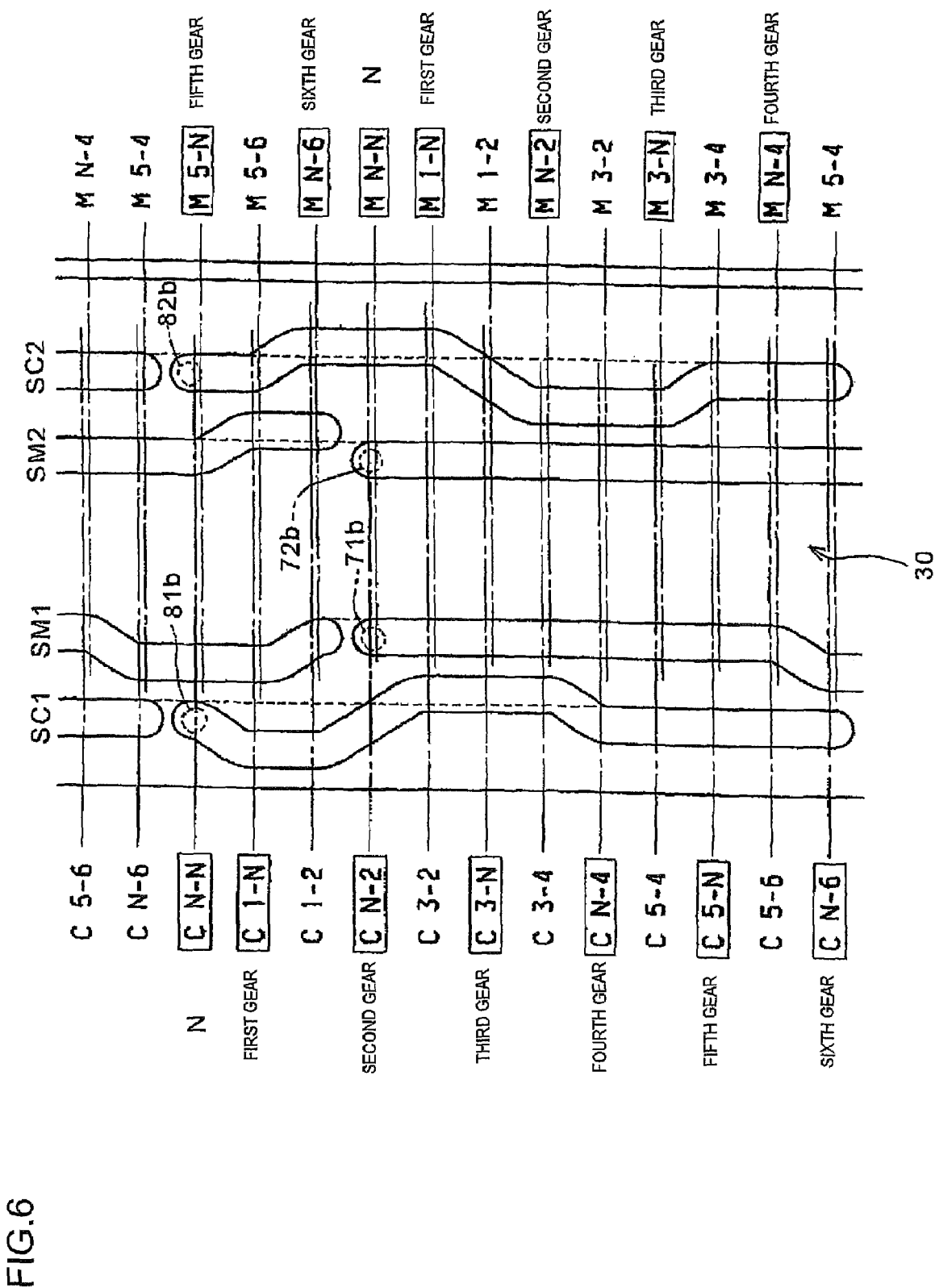
FIG. 6 is a development elevation showing the shape of a guide groove of a shift drum.

FIG. 5 is an enlarged cross-section of the transmission mechanism 20. FIG. 6 is a development elevation showing the shape of the guide groove of the shift drum 30. The transmission mechanism 20 drives the above-described four slidable gears, and hence is provided with the four shift forks 71, 72, 81, and 82 slidably attached to two guide shafts 31 and 32. The four shift forks are provided with engaging claws (71a, 72a, 81a, and 82a) which engage the slidable gears, and cylindrical projections (71b, 72b, 81b, and 82b) which engage the guide grooves formed on the shift drum 30.

The shift fork 71 which engages the third gear speed drive gear M3 and the shift fork 72 which engages the fourth gear speed drive gear M4 are attached to the guide shaft 31. The shift fork 81 which engages the fifth gear speed driven gear C5 and the shift fork 82 which engages the sixth gear speed driven gear C6 are attached to the guide shaft 32 on the other side.

The surface of the shift drum 30 disposed in parallel to the guide shafts 31 and 32 is formed with guide grooves SM1 and SM2 with which the shift forks 71 and 72 on the side of the main shaft engage and guide grooves SC1 and SC2 with which the shift forks 81 and 82 on the side of the counter shaft engage. Accordingly, the slidable gears M3, M4, C5, and C6 are driven along the shape of the four guide grooves in association with the rotational operation of the shift drum 30.

The shift drum 30 is driven to rotate to a predetermined position by the shift control motor 21. The rotary drive force of the shift control motor 21 is transmitted to a shift drum shaft 29 which supports the hollow cylindrical shift drum 30 via a first gear 23 fixed to a revolving shaft 22 and a second gear 24 which engages the first gear 23. The shift drum shaft 29 is connected to the shift drum 30 via a lost motion mechanism 4.

The lost motion mechanism 4 is a mechanism to prevent an excessive load from generating in the shift control motor 21 by connecting the shift drum shaft 29 and the shift drum 30 with a torsion coil spring 5 to absorb the movement of the shift control motor 21 temporarily with the torsion coil spring 5 even when the dog clutch does not engage and hence the shift drum 30 cannot be rotated as intended. The lost motion mechanism 4 includes a drive rotor 7 attached to the end of the shift drum shaft 29, a driven rotor 6 attached to the end of the shift drum 30, and the torsion coil spring 5 for connecting the drive rotor 7 and the driven rotor 6. Accordingly, when the shift drum 30 is brought into a rotatable state in a state in which the movement of the shift control motor 21 is temporarily absorbed, the shift drum 30 rotates to a predetermined position by a resilient force of the torsion coil spring 5.

The gear position sensor 134 (see FIG. 3) senses the actual rotational angle of the shift drum 30, and hence is disposed so as to sense the rotational angle of the shift drum 30 or the driven rotor 6. The shifter sensor 27 is able to sense whether or not the shift drum 30 is at a predetermined position of the shift control motor 21 on the basis of the position of the cam 28 rotated by a pin 26 embedded in a shifter 25 fixed to the shift drum shaft 29.

Referring now to the development elevation in FIG. 6, the positional relation between the rotational position of the shift drum 30 and the four shift forks will be described. The guide shafts 31 and 32 are disposed at positions apart from about 90° in the circumferential direction with reference to the axis of rotation of the shift drum 30. For example, when the rotational position of the shift drum 30 is at the neutral (N), the shift forks 81 and 82 are at the position of "C N-N" displayed on the left side in the drawing, while the shift forks 71 and 72 are at the position of "M N-N" on the right side in the drawing. In this drawing, the positions of cylindrical projections (71b, 72b, 81b, and 82b) of the respective shift forks at the neutral are shown by a broken line circle. Predetermined rotational positions continuing from the "C N-N" shown on the left side in the drawing downward and predetermined rotational positions continuing from "M N-N" displayed on the right side in the drawing downward are provided at 30° intervals. In this drawing, the positions waiting for the "neutral", described later, from among the predetermined rotational angles are surrounded by a square.

The sliding positions of the shift forks determined by the respective guide grooves are two positions of "left" and "right" for the guide grooves SM1 and SM2 on the side of the main shaft and three positions of "left", "center", and "right" for the guide grooves SC1 and SC2 on the side of the counter shaft.

The respective shift forks when the shift drum 30 is at the neutral position are such that the shift fork 81 is at the center, the shift fork 82 is at the center, the shift fork 71 is at the right, and the shift fork 72 is at the left. This is a state in which the four slidable gears driven by the respective shift forks do not engage with any one of the adjacent unslidable gears. Therefore, even when the first clutch CL1 or the second clutch CL2 is connected, the rotary drive force of the primary driven gear 3 is not transmitted to the countershaft 9.

Subsequently, when the shift drum 30 is rotated to a positions corresponding to the first speed gear ("C 1-N" and "M 1-N") from the above-described neutral position, the shift fork 81 is switched from the center to the left, and hence the fifth gear speed driven gear C5 is switched from the center to the left. Accordingly, the fifth gear speed driven gear C5 engages the first gear speed driven gear C1 by the dog clutch, and is brought into a state of being capable of transmitting the rotary drive force. In this state, when the first clutch CL1 is switched to the connected state, the rotary drive force is transmitted from the inner main shaft 7 through the first gear speed drive gear M1, the first gear speed driven gear C1, the fifth gear speed driven gear C5, to the countershaft 9 in sequence.

When the transmission to the first gear is completed, the shift drum 30 is rotated automatically in the shift-up direction by 30°. This rotational operation is referred to as "up-side preparative transmission" for causing the transmission to be completed only by switching the connecting state of the twin clutch TCL when the transmission command to the second gear is issued. With this up-side preparative transmission, the two guide shafts move to the positions of the "C 1-2" and "M 1-2" on the left and right in the drawing.

The change of the guide grooves in association with the up-side preparative transmission is only such that the guide groove SC2 is switched from the center to the right, whereby the shift fork 82 is moved to the right, and the sixth gear speed driven gear C6 engages the second gear speed driven gear C2 by the dog clutch. At the time when the up-side preparative transmission is completed, the second clutch CL2 is in the blocked state, and hence the outer main shaft 6 is rotated in association with the viscosity of the lubricant filled between the outer main shaft 6 and the inner main shaft 7.

The preparation for transmitting the rotary drive force via the second speed gear is ready by the above-described up-side preparative transmission. When the transmission command to the second speed is issued in this state, the first clutch CL1 is blocked and the second clutch CL2 is switched to the connected state. With this switching operation of the clutches, the rotary drive force is not discontinued, and the transmission operation to the second gear is completed immediately.

Subsequently, when the transmission operation from the first gear to the second gear is completed, the up-side preparative transmission for causing the transmission operation from the second gear to the third gear to be completed only by the switching of the clutches is carried out. In the up-side preparative transmission from the second gear to the third gear, the guide shaft on the side of the counter shaft is moved from "C 1-2" to "C 3-2" displayed on the left side of the drawing, and the guide shaft on the side of the main shaft is moved from "M 1-2" to "M 3-2" displayed on the right side in the drawing. The change of the guide grooves in association thereto is only such that the guide groove SC1 is switched from the left to the right, whereby the shift fork 81 is moved from the left to the right and the fifth gear speed driven gear C5 and the third gear speed driven gear C3 engages by the dog clutch.

When the up-side preparative transmission from the second gear to the third gear is completed, the connecting state of the twin clutch TCL is switched from the second clutch CL2 to the first clutch CL1, in other words, the transmission operation from the second gear to the third gear is completed only by the switching operation of the clutches. The up-side preparative transmission is carried out in the same manner from then onward until the fifth gear is selected.

In the up-side preparative transmission from the second gear to the third gear described above, the guide groove SC1 passes through the center at the "C N-2" displayed on the left side in the drawing, that is, at the position where the engagement by the dog clutch is not achieved. The rotational position of the shift drum 30 is sensed by the gear position sensor 134 and the revolving speed thereof is finely adjusted by the shift control motor 21. Accordingly, for example, it is possible to differentiate the revolving speed from "C 1-2" to "C N-2" displayed on the left side in the drawing, that is, the speed when releasing the engagement of the dog clutch between the driven gears C1 and C5 from the revolving speed from "C N-2" to "C 3-2", that is, the speed when causing the dog clutch to engage between the driven gears C5 and C3, or to perform "waiting for the neutral", that is, to stop for a predetermined time period at the position of "C N-2". According to the configuration of the AMT 1 as described above, for example, when the vehicle is traveling at the second gear, the rotational position of the shift drum 30 can be changed arbitrarily among the "1-2", "N-2", and "3-2".

When the neutral waiting control which causes the shift drum 30 to stop temporarily at the position of "waiting for the neutral" is carried out at a predetermined timing, the transmission shock which is liable to occur when the dog clutch is disconnected can be alleviated. The drive timing or the drive speed of the shift drum 30 can be adjusted as needed according to the number of gear speeds or the number of engine revolution at the time of transmission as well.

When the shift drum 30 is at the position of the "waiting for the neutral", one transmission gear pair on the side of the odd-numbered gear speed or on the side of the even-numbered gear speed is in the neutral state. For example, at the position of the above-described "C N-2", the dog clutch between the driven gears C2 and C6 engages, and the driven gear C5 is in the neutral state where it does not engage any one of the driven gears C1 and C3. Therefore, even when the first clutch CL1 is switched to the connected state at this moment, only the inner main shaft 7 is rotated and the transmission of the rotary drive force to the countershaft 9 is not affected.

Figure 7:
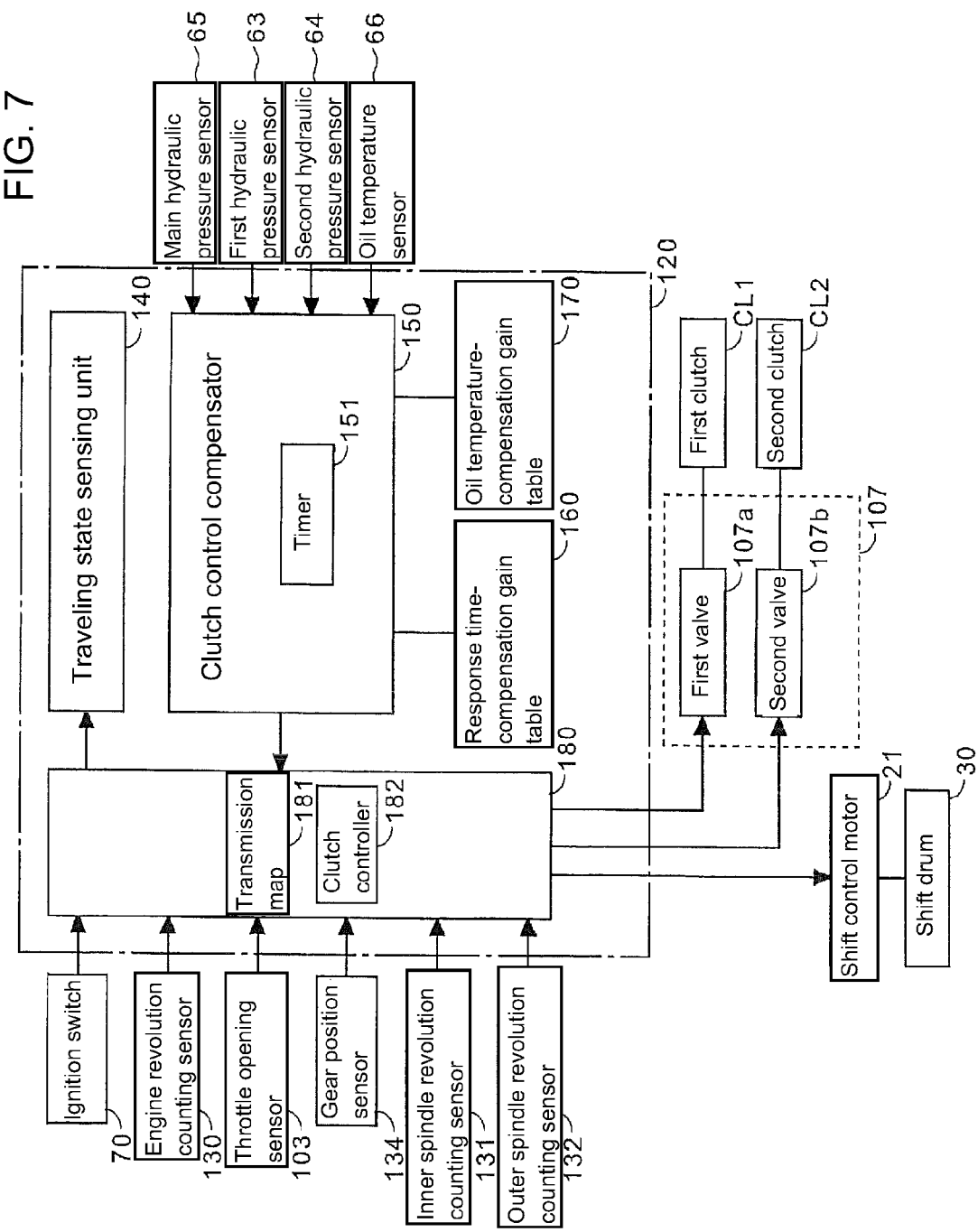
FIG. 7 is a block diagram showing a configuration of an AMT control unit.

FIG. 7 is a block diagram showing a configuration of the AMT control unit 120 as the clutch control system. The AMT control unit 120 includes a transmission control unit 180 including a transmission map 181 and a clutch controller 182, a traveling state sensing unit 140, a clutch control compensator 150 having a timer 151, a response time-compensation gain table 160, and the oil temperature-compensation gain table 170.

The transmission control unit 180 drives the shift control motor 21 and the valve 107 according to the transmission map 181 including a three-dimensional map on the basis of the vehicle speed data and the output signals from the engine revolution counting sensor 130, the throttle opening sensor 103, and the gear position sensor 134 when the vehicle is in normal travel. The vehicle speed data can be calculated on the basis of the gear shift position by the gear position sensor 134, and the output signals from the inner spindle revolution counting sensor 131 and the outer spindle revolution counting sensor 132. The transmission control unit 180 receives the supply of the output signal from the ignition switch 70 which connects and disconnects the main power of a motorcycle 10.

The AMT control unit 120 in the embodiment is characterized in that the viscosity change of the hydraulic oil for driving the both clutches is sensed to calculate the control compensation value, and the both clutches can be feedback-controlled by applying the control compensation value. More specifically, a response period from when the supply of the hydraulic pressure to the clutch is started until the hydraulic pressure exerted on the clutch reaches a predetermined value is calculated, and the control compensation value is calculated on the basis of the response time. Accordingly, even when the characteristic of the hydraulic oil is changed due to the deterioration or replacement of the hydraulic oil, the viscosity change of the hydraulic oil can be adequately sensed, and hence further ideal clutch control is achieved.

The traveling state sensing unit 140 determines the state of traveling of the motorcycle 10 (during stop, during travel, gear shift position, right after start of engine, and so on) on the basis of the output data from the respective sensor to be entered to the transmission control unit 180. The clutch control compensator 150 receives the supply of the respective output data from the main hydraulic pressure sensor 65, the first hydraulic pressure sensor 63, the second hydraulic pressure sensor 64, and the oil temperature sensor 66. The above-described control compensation value of the clutch is calculated by the clutch control compensator 150. The response time-compensation gain table 160 and the oil temperature-compensation gain table 170 are referenced when calculating the control compensation value of the clutch.

Figure 8:
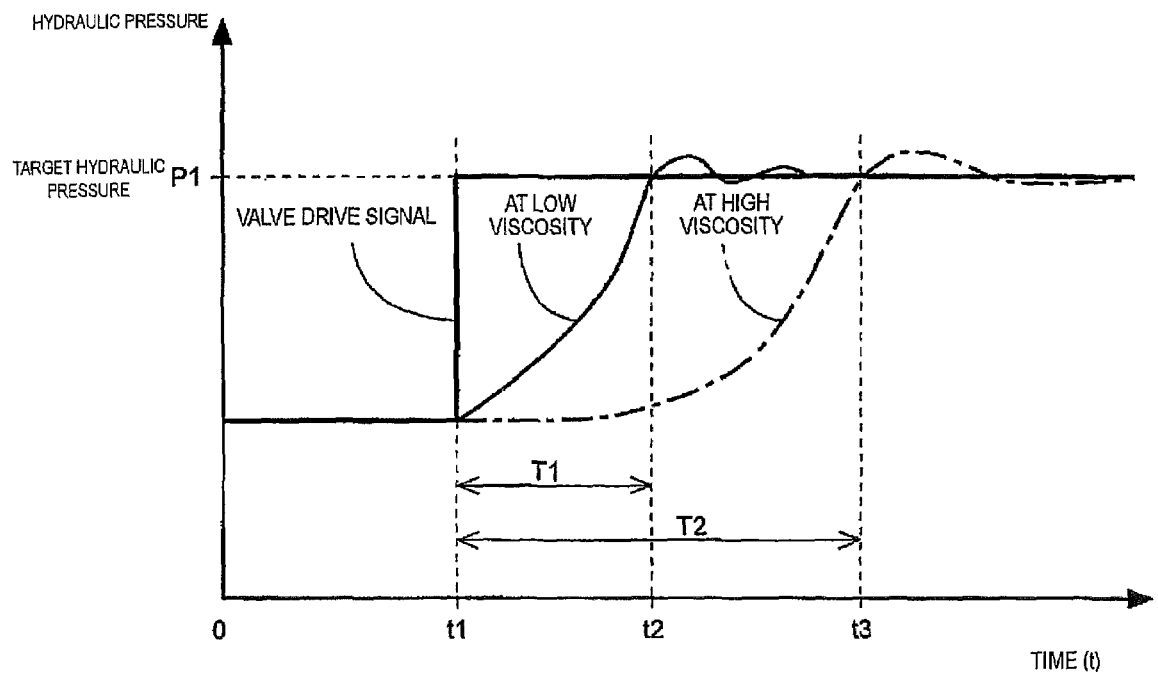
FIG. 8 is a graph showing the relation between the viscosity of the hydraulic oil and the hydraulic pressure response time.

FIG. 8 is a graph showing the relation between the viscosity of the hydraulic oil and the hydraulic pressure response time. The hydraulic oil for driving the clutch changes in viscosity due to the type of the hydraulic oil or deterioration due to the change with age in addition to the change in temperature by the heat of the engine. This graph shows an example of a case where the time period before the clutch hydraulic pressure reaches the predetermined value is different depending on the difference in viscosity when the drive signal which rises in a square shape at the time t1 is applied to the value which opens and closes the conduit.

According to the graph, when the viscosity of the hydraulic oil is low because the temperature is high or the deterioration is proceeded, the hydraulic pressure reaches a target hydraulic pressure P1 at a time t2, which is a response time T1 after a time t1. In contrast, when the viscosity of the hydraulic oil is high because the temperature is low or the hydraulic oil is new, the hydraulic pressure reaches the target hydraulic pressure P1 at a time t3, which is a response time T2 after the time t1. When there is such a difference in response time, the timing of clutch connection varies even when the same drive command is issued, so that the feeling of travel at the time of starting movement or at the time of transmission varies correspondingly.

Figure 9:
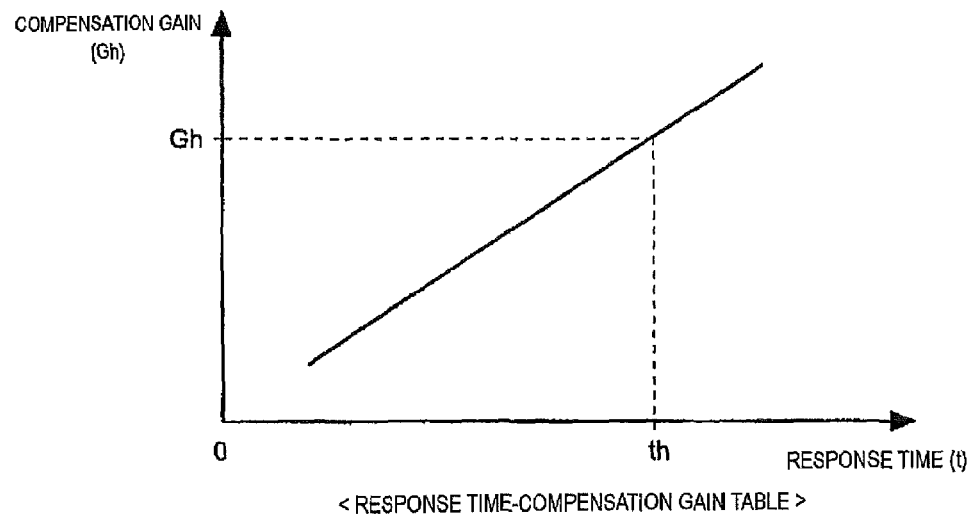
FIG. 9 shows an example of a response time-compensation gain table.

FIG. 9 shows an example of the response time-compensation gain table 160 stored in the AMT control unit 120. In the embodiment, the response period from when the supply of the hydraulic pressure to the clutch is started until when the hydraulic pressure exerted on the clutch reaches a predetermined value is counted by the timer 151 (see FIG. 7) of the clutch control compensator 150, and the compensation gain is derived by applying the measured response time to the response time-compensation gain table 160. The response time-compensation gain table 160 is set to increase a compensation gain Gh with increase in response time t. Accordingly, the speed of opening the valve 107 can be increased by increasing the drive current of the valve 107 with increase in viscosity of the hydraulic oil. The timing when the clutch controller 182 outputs the drive signal to the valve 107 may be employed as the timing to start the measurement of the time period by the timer 151.

Figure 10A:
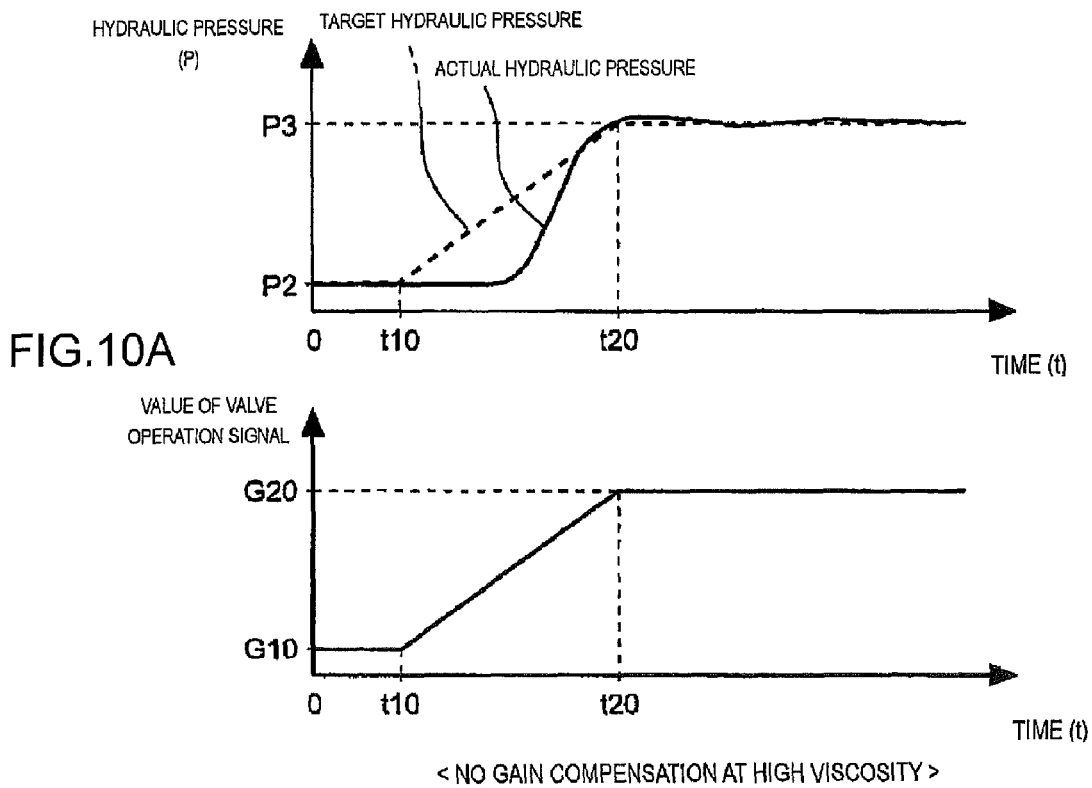
FIGS. 10A and B show graphs of the transition of the hydraulic pressure of the clutch according to the presence or absence of the gain compensation.
Figure 10B:
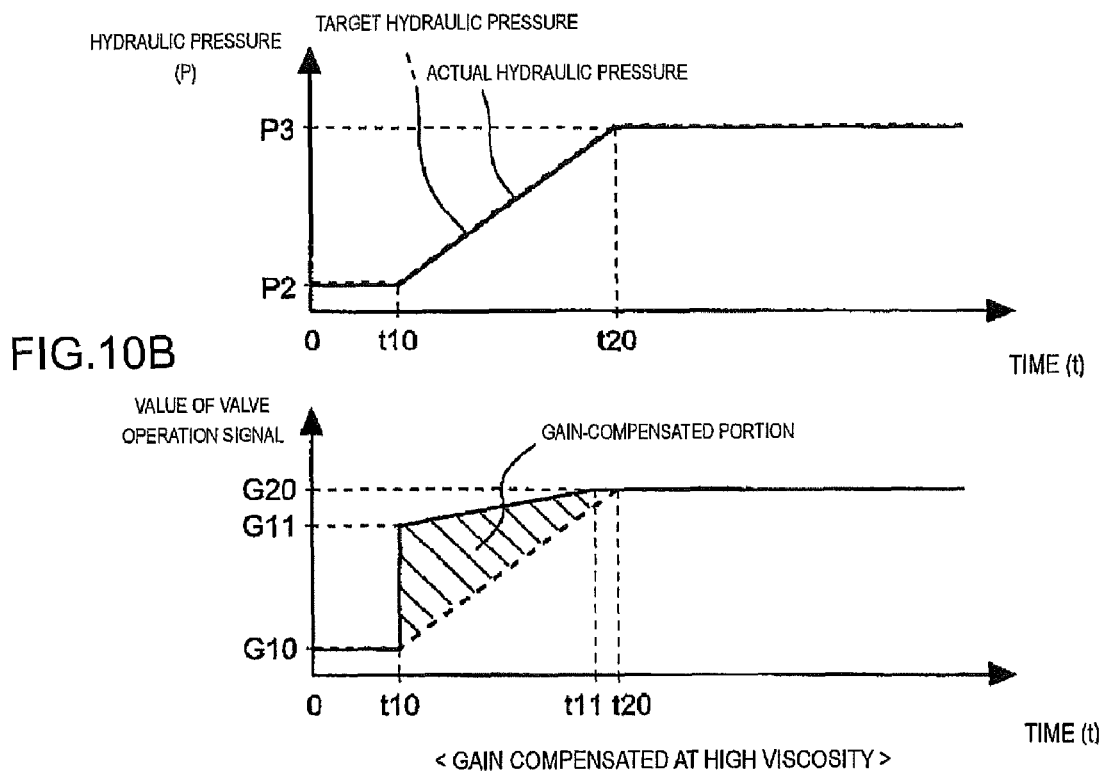

FIGS. 10A and 10B show graphs of the transition of the hydraulic pressure of the clutch when the viscosity of the hydraulic oil is high, in a case (a) when the gain correction is not carried out and a case (b) when the gain correction is carried out. In both graphs, it is intended to increase an initial hydraulic pressure P2 linearly and reach a target hydraulic pressure P3 during a period from a time t10 to a time t20.

In FIG. 10A, the valve is controlled to drive to increase the value of the valve operating signal linearly from G10 at the time t10 to cause the value of the valve operating signal to reach G20 at the time t20. However, since the viscosity of the hydraulic oil is high, rising of the hydraulic pressure is delayed. Accordingly, the transition of the actual hydraulic pressure exerted on the clutch cannot comply with the target hydraulic pressure. When such a delay of compliance occurs, the timing of the clutch connection is delayed, and hence the number of engine revolution might increase during this delay. Then, the hydraulic pressure is abruptly increased and the clutch is abruptly connected, and hence the feelings at the time of starting movement and at the time of transmission are different significantly.

In contrast, in FIG. 10B which shows a case in which the control correction value is applied, the value of the valve operation signal is compensated to a value G11 which is larger than the normal value at the time t10, and then is increased to G20 during a period until a time t11, so that generation of the actual hydraulic pressure which matches the target hydraulic pressure is enabled.

Even when the compensation gain Gh derived by the response time-compensation gain table 160 is the same, the value of the clutch operation signal calculated as the control compensation value varies according to the state of travel of the vehicle. For example, the adequate clutch control at the time of starting movement is different from that while traveling, and is also different depending on the vehicle speed or the gear shift position at the time of transmission while traveling. In the embodiment, data tables of the standard clutch operation signal gain according to various states of travel when the hydraulic oil has a predetermined viscosity are prepared, and the compensation gain derived by the above-described measurement of the response time is applied as the compensation value for the standard clutch operation signal gain. The clutch control compensator 150 is adapted to calculate an optimal control compensation value on the basis of the state of traveling of the vehicle sensed by a traveling state sensing unit 140 and the compensation gain Gh derived by the response time-compensation gain table 160.

As described above, in the clutch control system in the embodiment of the invention, the viscosity change of the hydraulic oil is estimated and sensed by measuring the time period from when the supply of the hydraulic pressure to the clutch is started until when the hydraulic pressure reaches the predetermined value, and the hydraulic pressure clutch can be feedback-controlled using the control compensation value on the basis of the estimated viscosity change. Accordingly, even when the viscosity of the hydraulic oil is changed by replacement or the temperature change thereof, a stable feeling of travel is achieved without changing the timing of connection or disconnection of the hydraulic pressure clutch.

Measurement of the time period from when the supply of the hydraulic pressure to the clutch is started until when the hydraulic pressure reaches the predetermined value can be carried out only when the driving of the clutch does not affect the transmission of the rotary drive force. In the case of a single-clutch sequential transmission, this state is realized only when a shift drum is at the neutral position. In contrast, in the case of the AMT 1 in the embodiment, even when the shift drum 30 is at the position of "waiting for the neutral" in addition to the case where the shift drum 30 is at the neutral position, the measurement of the response time can be carried out with the clutch on the corresponding side. Therefore, the control compensation value of the clutch can be updated by carrying out the measurement of the response time with respect to the first clutch CL1 and the second clutch CL2 not only when the vehicle is stopped, but also while travelling.

Figure 11:
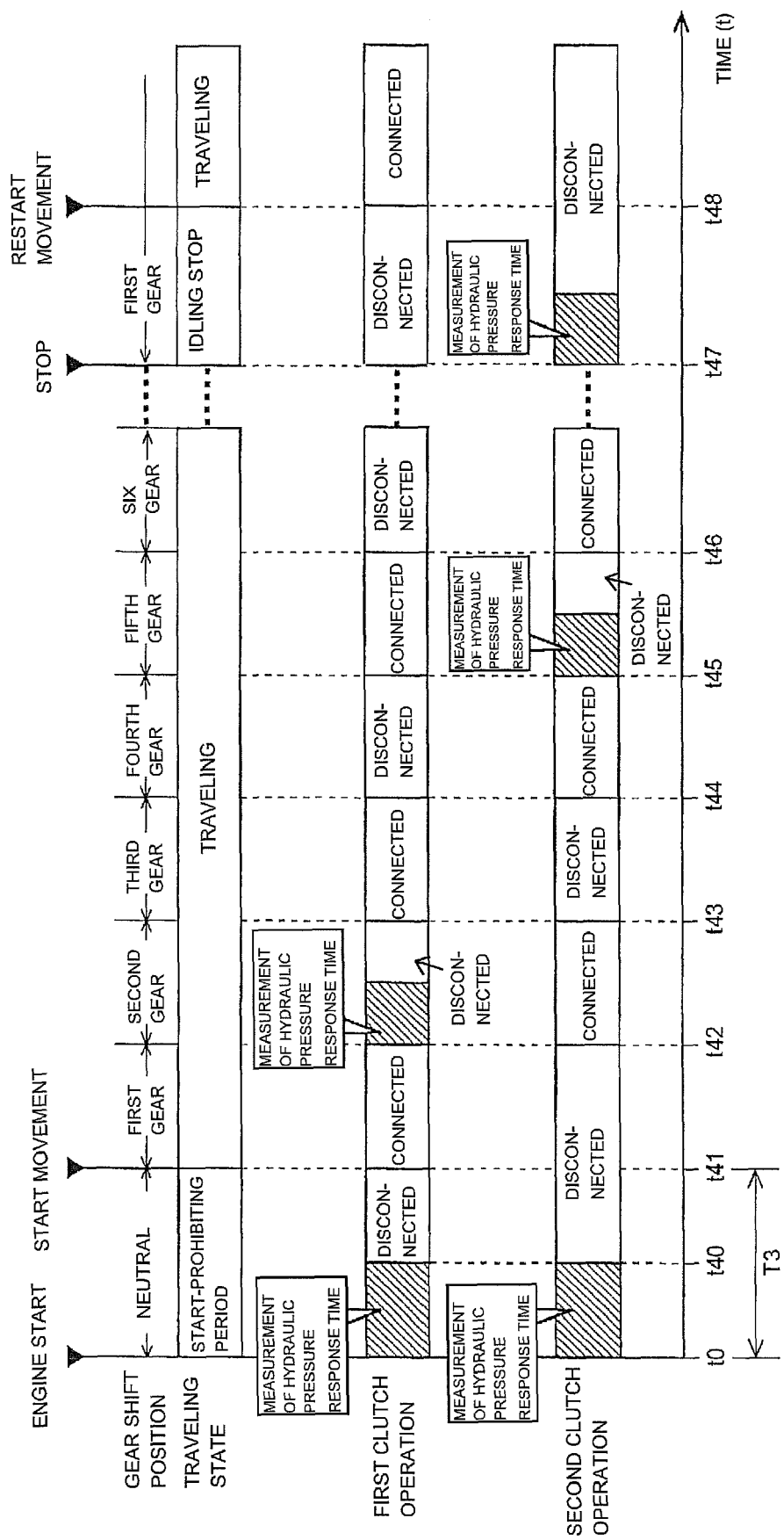
FIG. 11 is a time chart showing an example of the timing of measurement of the hydraulic pressure response time.

FIG. 11 is a time chart showing an example of the timing of measurement of the hydraulic response time. FIG. 11 shows operating states of the first clutch CL1 and the second clutch CL2 in various states of traveling of the vehicle. The time chart shows an example of operation of a case in which the transmission mode of the AMT 1 is set to an automatic transmission (AT) mode.

When the engine 100 is started at a time t0, the transmission control unit 180 of the AMT control unit 120 sets the time period of a predetermined time T3 until a time t41 as a start prohibiting period. During the start prohibiting period, since the shift drum 30 is set to be maintained at the neutral position even when the occupant operates the neutral select switch 117 to switch the gear from the neutral (N) to the drive (D), the vehicle cannot be started even when the throttle operation is carried out.

When the traveling state sensing unit 140 senses the fact that the vehicle is in the start prohibiting period, the timer 151 carries out the measurement of the hydraulic pressure response time for the first clutch CL1 and the second clutch CL2. When the measurement of the hydraulic pressure response time at a time t40 is completed, the control compensation value is immediately calculated by the clutch control compensator 150. Accordingly, the clutch control in which the control compensation value is applied is enabled when the vehicle starts to move. The first clutch CL1 and the second clutch CL2 are both in the disconnected state until the end of the start prohibiting period.

Subsequently, when the occupant operates the neutral select switch 117 to the drive (D) at the time t41, the shift drum 30 is rotated to a predetermined position of rotation (in this example of operation, to the first gear). Then, when the occupant operates the throttle, the first clutch CL1 is switched to the connected state, and then the vehicle starts to move (in this example of operation, it is assumed that the neutral select switch 117 is switched to the drive (D) and, simultaneously, the throttle is operated at the same time with the termination of the start prohibiting period). Then, at a time t42, transmission from the first gear to the second gear is automatically carried out in association with the increase in vehicle speed. As described above, the AMT 1 in the embodiment is adapted to complete the transmission operation only by switching the connecting state of the clutch, and at the time t42, the first clutch CL1 is disconnected and the second clutch CL2 is connected, so that the transmission operation to the second gear is completed. From then onward, the same transmission operation is repeated until the gear is shifted up to the sixth gear.

When the first clutch CL1 is brought into the disconnected state in association with the shifting-up to the second gear, the clutch control compensator 150 carries out measurement of the response time by the first clutch CL1. Furthermore, after having shifted up to the third gear at a time t43, and to the fourth gear at a time t44, at the timing of having shifted up to the fifth gear at a time t45, the clutch control compensator 150 carries out the measurement of the response time by the second clutch CL2 disconnected correspondingly.

According to the setting of the timing of measurement of the response time as described above, the measurement of the response time can be carried out by using any one of the first clutch CL1 and the second clutch CL2 even when the vehicle is travelling. In the example shown in the drawing, the measurement of the response time is carried out at the timing of shifting up to the second gear and the fifth gear. However, the measurement can be carried out every time when the shifting up is carried out. Also, the measurement of the hydraulic pressure response time can be carried out at the predetermined frequency on the basis of the elapsed time from the previous measurement or the number of times of transmission of the AMT 1.

When the measurement of the hydraulic pressure response time is carried out at the predetermined frequency, the predetermined frequency may be changed according to the measured value of the oil temperature sensor 66 (see FIG. 7). Accordingly, for example, when the hydraulic oil having a characteristic such that the rate of viscosity change with respect to the same temperature change is larger when the temperature is low than when the temperature is high is used, the calculation of the clutch control compensation value can be carried out efficiently by setting such as reducing the predetermined frequency at the low temperature to increase the frequency of calculation of the clutch control compensation value, while increasing the predetermined frequency at the high temperature.

Then, in this example of operation, after having shifted up to the sixth gear at a time t46, the vehicle is temporarily stopped at a time t47 after a predetermined traveling period on the basis of the intention of the occupant to stop. At this time, the transmission control unit 180 brings the first clutch CL1 and the second clutch CL2 into the disconnected state. Then, when the periodic timing of the measurement of the response time arrives, the clutch control compensator 150 carries out the measurement of the response time by the second clutch CL2. The reason why the measurement of the response time is carried out only for the second clutch CL2 unlike the measurement during the start prohibiting period at the times t0 to t41 is for preventing the start of movement from being delayed also when the occupant abruptly carries out the operation to start movement by avoiding the driving of the first clutch CL1 which is connected when the first gear is selected and the vehicle starts movement. In this example of operation, the gear is shifted down to the first gear automatically when the vehicle is temporarily stopped. However, in the manual mode which accepts the occupant's shifting operation, the temporary stop is achieved at the transmission gears other than the first gear. When the vehicle is temporarily stopped at the second gear for example, the measurement of the response time for the first clutch CL1 can be carried out.

When the occupant operates the throttle at a time t48, the vehicle starts movement and returns to the traveling state again.

Figure 12B:
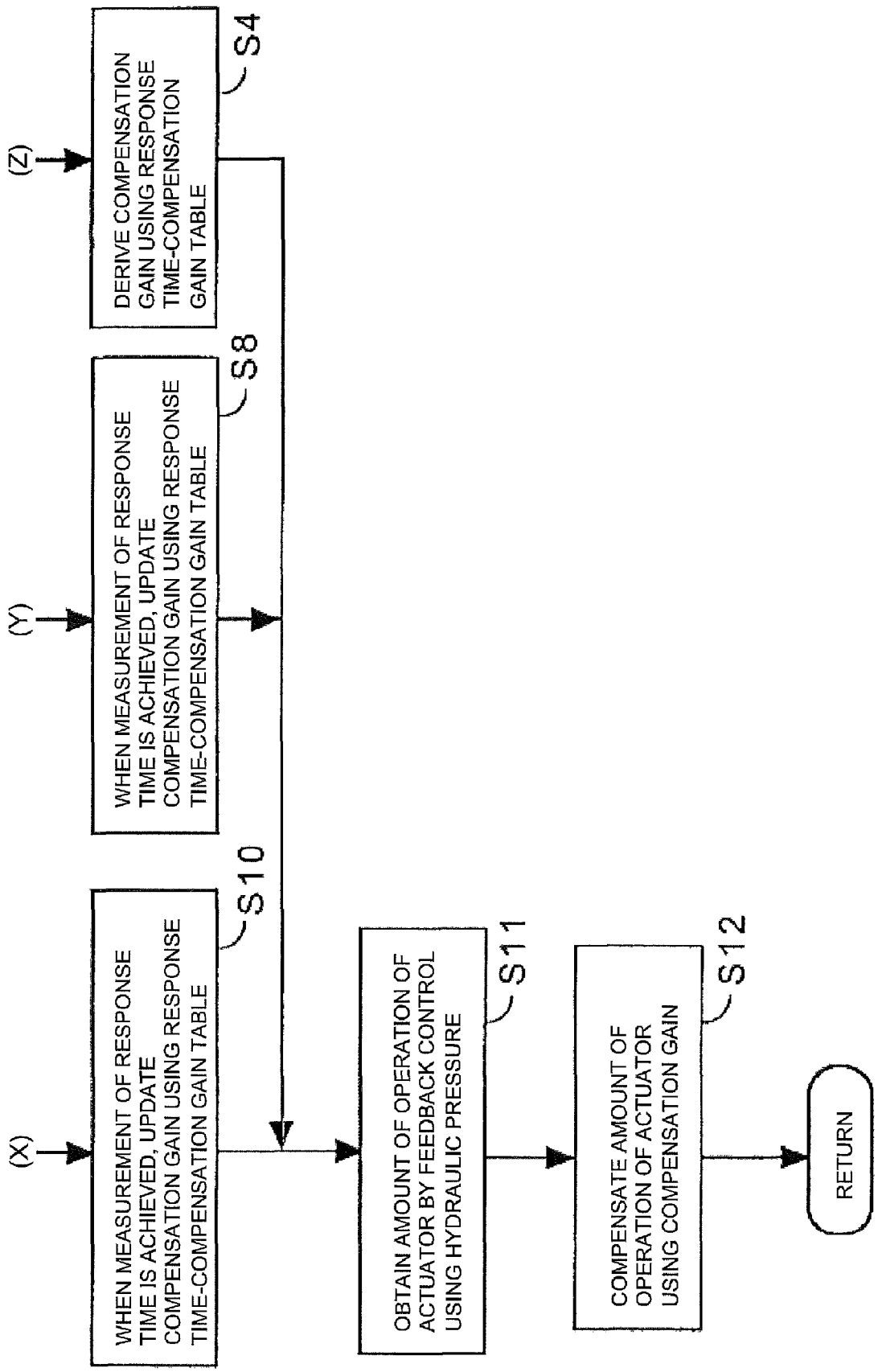

FIG. 12 is a flowchart showing the flow of the clutch control according to the embodiment. This flowchart corresponds to the time chart in FIG. 11. In Step S1, whether or not it is the start prohibiting period is determined, and if yes, the procedure goes to Step S3. In Step S3, the measurement of the hydraulic pressure response time is carried out at the first clutch CL1 and the second clutch CL2, and subsequently in Step S4, the compensation gain is derived by using the response time-compensation gain table.

When it is determined to be negative in Step S1, the procedure goes to Step S2, and whether or not a period when the measurement of the hydraulic pressure response time cannot be carried out has elapsed by a predetermined period is determined. When it is determined to be positive in Step S2, the procedure goes to Step S5, and the compensation gain is updated using the oil temperature-compensation gain table, and then the procedure goes to Step S6. When it is determined to be negative in Step S2, the procedure goes to Step S6 without updating the compensation gain by the oil temperature-compensation gain table.

In Step S6, whether or not the vehicle is traveling is determined. When it is determined to be positive in Step S6, the procedure goes to Step S7, and the hydraulic pressure response time of the clutch which is disconnected, that is, the clutch which is not used is measured. Then, the procedure goes to Step S8, and when the measurement of the response time is achieved, the compensation gain is updated using the response time-compensation gain table.

In contrast, when it is determined to be negative in Step S6, it is considered to be stopped temporarily (during idling stop) and the procedure goes to Step S9, and the measurement of the hydraulic pressure response time is carried out by using one of the first and second clutches which is not used for starting the movement. In the normal temporarily stop, the first gear is selected, and the hydraulic pressure response time of the second clutch CL2 is measured. However, when the second gear is selected by the operation of the occupant, the hydraulic pressure response time can be measured using the first clutch CL1. Then, when the measurement of the response time is achieved in subsequent Step S10, the compensation gain is updated using the response time-compensation gain table.

In Step S11, the amount of operation of the actuator is obtained by the feedback control using the hydraulic pressure, and in subsequent Step S12, the compensation gain derived or updated in Steps S4, S8, and S10 is applied to compensate the amount of operation of the actuator, thereby terminating the ordinary control.

The determination in Step S2 significantly depends on the time period required for the measurement of the hydraulic pressure response time. More specifically, when the measurement of the hydraulic pressure response time is completed in a very short time, there is no problem in measurement of time period at every transmission operation while traveling and when the vehicle is in idling stop. However, when a certain extent of time period is required for the measurement of the hydraulic pressure response time because the capacity of the clutch is larger than the capacity of the hydraulic pump, or because the inner diameter of the conduit which connects the hydraulic pump and the clutch is large, it is supposed that the measurement of time period cannot be completed while traveling or when the vehicle is in the idling stop because the operating states of the both clutches change before the measurement of time period is ended.

For example, when the operation of the select switch by the occupant is carried out consecutively in succession in a short time in a state in which the AMT 1 is set to the manual mode, it is supposed that the vehicle continues traveling while failing the derivation of the control compensation values of the both clutches. Even when the vehicle is temporarily stopped, if the restarting operation is carried out immediately, it is supposed that the vehicle starts movement again while failing the derivation of the control compensating valve of the second clutch. In the embodiment, as a function to accommodate such an event, a data table which specifies the relation between the oil temperature and the compensation gain is prepared and, when the measurement of the response time cannot be carried out for a predetermined period, so that a provisional control compensation value, that is, an alternative value can be derived on the basis of the data table.

Figure 13:
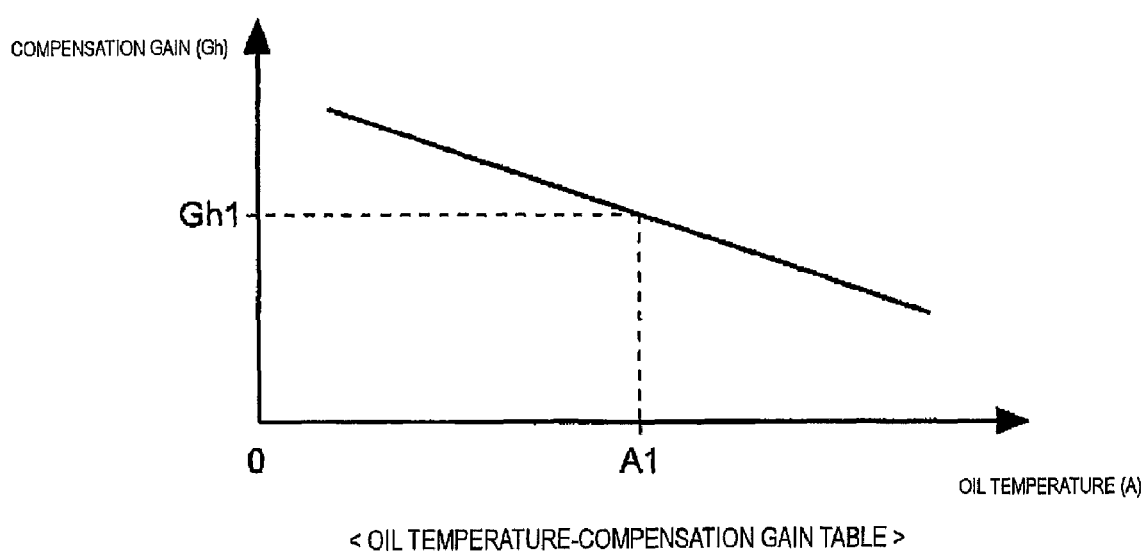
FIG. 13 is an example of the oil temperature-compensation gain table.

FIG. 13 shows an example of the oil temperature-compensation gain table 170 stored in the AMT control unit 120. In the oil temperature-compensation gain table 170, the compensation gain Gh is set to be reduced with decrease in oil temperature T. Therefore, the drive current of the valve 107 can be increased with increase in viscosity of the hydraulic oil as in the case of the above-described response time-compensation gain table 160. When the control compensation value by the oil temperature-compensation gain table 170 is applied as well, the control is switched to the feedback control using the response time-compensation gain table 160 when the measurement of the hydraulic pressure response time is enabled.

As described above, according to the clutch control system in the embodiment of the invention, the viscosity change of the hydraulic oil is estimated and sensed by measuring the time period from when the supply of the hydraulic pressure to the hydraulic pressure clutch is started until when the hydraulic pressure reaches the predetermined value, and the hydraulic pressure clutch can be feedback-controlled using the control compensation value on the basis of the estimated viscosity change. Accordingly, even when the viscosity characteristics of the hydraulic oil is changed by replacement or deterioration thereof, a stable feeling of travel is achieved without changing the timing of connecting or disconnecting the hydraulic clutch. When the embodiment of the invention is applied to a twin-clutch sequential transmission, the measurement of the time period is carried out using one of the first clutch and the second clutch which is not in use even when the vehicle is traveling, and hence even when the temperature of the hydraulic oil is changed while traveling, the control compensation value corresponding thereto is applied in sequence, so that the control of the hydraulic pressure clutch is enabled.

The configuration of the AMT and the AMT control unit, the configuration of the response time-compensation gain table and the oil temperature-compensation gain table, the predetermined hydraulic pressure for measuring the hydraulic pressure response time, setting of the predetermined frequency for measuring the hydraulic pressure response time, and the determination means for determining the traveling state in the traveling state sensing unit are not limited to those shown in the above-described embodiment, and various modifications may be made. For example, the feedback control in the measurement of the hydraulic pressure response time in the invention may be used in parallel with the feedback control which senses whether or not the drive portion of the clutch is driven as instructed before implementation. The clutch control system according to the invention is not limited to the motorcycle, and may be applied also to the transmission device for a three-wheel car or a four-wheel car.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A clutch control system for a vehicle, comprising:
   an actuator provided between a hydraulic pressure supply source and a hydraulic clutch and configured to control a hydraulic pressure of hydraulic oil supplied by the hydraulic pressure supply source to the hydraulic clutch which is configured to connect and disconnect a drive wheel and a power source of the vehicle;
   a hydraulic pressure detector configured to detect the hydraulic pressure;
   a timer configured to measure a time period from a time at which the hydraulic pressure supply source starts supplying hydraulic oil to the hydraulic clutch to a time at which the hydraulic pressure detected by the hydraulic pressure detector reaches a predetermined value;

a clutch control compensator configured to calculate a control compensation value of an amount of operation of the actuator based on the time period measured by the timer; and a clutch controller configured to control the actuator based on the control compensation value and the amount of operation of the actuator using a deviation between the hydraulic pressure detected by the hydraulic pressure detector and a target hydraulic pressure set according to a condition of the vehicle.

2. The clutch control system according to claim 1, wherein the timer is configured to measure the time period while the vehicle is stopped.

3. The clutch control system according to claim 2, wherein a disabled period during which the vehicle cannot start moving after the power source starts is provided and wherein the timer is configured to measure the time period before the vehicle starts moving.

4. The clutch control system according to claim 1, wherein the timer is configured to measure the time period at a predetermined frequency.

5. The clutch control system according to claim 4, further comprising:
   an oil temperature sensor configured to sense oil temperature of the hydraulic oil; and
   a time measure compensator configured to change the predetermined frequency based on the oil temperature sensed by the oil temperature sensor.

6. The clutch control system according to claim 4, wherein the clutch control compensator is configured to calculate an alternative value of the control compensation value based on the oil temperature sensed by the oil temperature sensor when the timer does not measure the time period during a predetermined period.

7. The clutch control system according to claim 1,
   wherein the hydraulic clutch comprises a first clutch and a second clutch and is configured to transmit a rotary drive force of the power source to the drive wheel by switching connecting states of the first clutch and the second clutch alternatively at every change-gear operation of a transmission, and
   wherein the timer is configured to measure the time period using one of the first clutch and the second clutch which is not connected while the vehicle is traveling.

8. The clutch control system according to claim 7, wherein the timer is configured to measure the time period, when the vehicle is temporarily stopped, with respect to one of the first clutch and the second clutch which is not connected when the vehicle starts traveling.

9. The clutch control system according to claim 1, wherein the clutch control compensator is configured to increase the control compensation value in accordance with an increase of the time period measured by the timer.

10. The clutch control system according to claim 1, wherein the clutch controller is configured to control the actuator using a feedback control.

11. A clutch control system for a vehicle, comprising:
    actuator means for controlling a hydraulic pressure of hydraulic oil supplied by a hydraulic pressure supply source to a hydraulic clutch which is configured to connect and disconnect a drive wheel and a power source of the vehicle;
    hydraulic pressure detecting means for detecting the hydraulic pressure;
    time measuring means for measuring a time period from a time at which the hydraulic pressure supply source starts supplying hydraulic oil to the hydraulic clutch to a time at which the hydraulic pressure detected by the hydraulic pressure detecting means reaches a predetermined value;
    clutch control compensation means for calculating a control compensation value of an amount of operation of the actuator means based on the time period measured by the time measuring means; and
    clutch controlling means for controlling the actuator means based on the control compensation value and the amount of operation of the actuator means using a deviation between the hydraulic pressure detected by the hydraulic pressure detecting means and a target hydraulic pressure set according to a condition of the vehicle.

12. The clutch control system according to claim 11, wherein the time measuring means is for measuring the time period while the vehicle is stopped.

13. The clutch control system according to claim 12, wherein a disabled period during which the vehicle cannot start moving after the power source starts is provided and wherein the time measuring means is for measuring the time period before the vehicle starts moving.

14. The clutch control system according to claim 11, wherein the time measuring means is for measuring the time period at a predetermined frequency.

15. The clutch control system according to claim 14, further comprising:
    an oil temperature sensor means for sensing oil temperature of the hydraulic oil; and
    a time measure compensation means for changing the predetermined frequency based on the oil temperature sensed by the oil temperature sensor means.

16. The clutch control system according to claim 14, wherein the clutch control compensation means is for calculating an alternative value of the control compensation value based on the oil temperature sensed by the oil temperature sensor means when the timer does not measure the time period during a predetermined period.

17. The clutch control system according to claim 11,
    wherein the hydraulic clutch comprises a first clutch and a second clutch and is configured to transmit a rotary drive force of the power source to the drive wheel by switching connecting states of the first clutch and the second clutch alternatively at every change-gear operation of a transmission, and
    wherein the time measuring means is for measuring the time period using one of the first clutch and the second clutch which is not connected while the vehicle is traveling.

18. The clutch control system according to claim 17, wherein the time measuring means is for measuring the time period, when the vehicle is temporarily stopped, with respect to one of the first clutch and the second clutch which is not connected when the vehicle starts traveling.

19. The clutch control system according to claim 11, wherein the clutch control compensation means is for increasing the control compensation value in accordance with an increase of the time period measured by the time measuring means.

20. The clutch control system according to claim 11, wherein the clutch controlling means is for controlling the actuator means using a feedback control.

* * * * *